3,196,171
OXO PROCESS
Chester G. Gunter, Park Forest, and Robert L. Baldner and Arnold N. Wennerberg, Chicago, Ill., assignors to Standard Oil Company, Chicago, Ill., a corporation of Indiana
No Drawing. Filed Nov. 21, 1960, Ser. No. 70,398
14 Claims. (Cl. 260—414)

This invention relates to the conversion of mono-olefinic hydrocarbons to aldehydes and alcohols by the oxo reaction process and more specifically pertains to a downstream treatment of the reactor effluent product from oxo reaction to separate and recover cobalt catalyst from the reactor effluent product in a form suitable for recycle to the oxo reaction. The invention also pertains to an integrated system incorporating in its combination of cooperative procedural steps the removal of cobalt catalyst and its recycle to the oxo reaction.

The reaction of an olefinic hydrocarbon with carbon monoxide and hydrogen at elevated temperatures and pressures in the presence of a cobalt catalyst to produce aldehydes or alcohols is well known and is employed commercially. Such a reaction is referred to herein as the "oxo reaction." It is also well known that the cobalt catalyst may be introduced into the oxo reaction as a cobalt salt. It is believed that the active cobalt catalyst is a cobalt carbonyl. The active cobalt catalyst has been added to the oxo reaction directly as cobalt carbonyl or has been formed in situ by adding a cobalt salt to the mixture charged to the oxo reaction zone. It is preferred to add to the reaction mixture cobalt salts of organic acids such as, for example, cobalt acetate, cobalt propionate, cobalt formate, cobalt nonanoate, cobalt stearate, cobalt tallate, cobalt oleate, cobalt palmitate, cobalt linoleate, cobalt naphthenate, and the like. Some of these salts are soluble in the olefinic charge stock. For cobalt salts which are insoluble in the olefinic charge stock, other solvents or reaction ingredients may be used; where water is injected along the olefinic charge stock, a water soluble cobalt salt is employed.

In the commercial application of the oxo reaction it has been found to be desirable to remove the cobalt catalyst from the oxo reaction product stream before recovering the aldehyde or alcohol product. One reason for removing the cobalt is to recover the cobalt in a form usable for recycle to the oxo reaction for cobalt is relatively expensive. Another reason for removing cobalt catalyst is that it appears to have a deleterious effect on the stability of the aldehyde or alcohol product. In the processing steps currently employed to recover cobalt, some appears in a water-soluble form and is drawn off in aqueous discards and some remains in the product which both plates out in the apparatus in subsequent processing steps and is drawn off in tower bottoms discards. Consequently some of the cobalt has only a once-through or single pass life. It is, therefore, advantageous from a technological as well as an economical standpoint to provide for a high recovery of cobalt values from the oxo reaction product stream.

The processes heretofore proposed for the removal of cobalt from the oxo reaction product stream have been mainly concerned with the conversion of the cobalt catalyst to an oil insoluble form, that is, a form not soluble in the olefin-aldehyde-alcohol mixture. For example, U.S. Patent 2,547,178 discloses contacting the organic product of oxo reaction with a gas containing oxygen to oxidize the soluble metal catalyst to an insoluble form which precipitates from the organic product and can be recovered by decantation or filtration. Decobalting is accomplished by the techniques of U.S. Patent 2,596,920 by a thermal decomposition provided by heated metal surfaces or heated cobalt free fluid to decompose the cobalt catalyst to an insoluble form. According to U.S. Patent 2,679,534 live steam or water is injected into the oxo reaction product at 200 to 500° F. where a liquid phase of water is maintained to convert cobalt catalyst to metallic cobalt, cobalt formate and basic cobalt formate which are insoluble even in the water phase and can be separated therefrom by filtration after separating the organic phase from the water phase. By the process of U.S. Patent 2,779,796 the oxo reaction product containing dissolved cobalt catalyst is treated with live steam to change the catalyst into an organic insoluble form of cobalt, accumulating cobalt as an interface aqueous emulsion associated with the aqueous layer and separating the aqueous and organic layers. The live steam supplies all the heat to decompose the cobalt catalyst rather than employing auxiliary heating surfaces.

Aqueous acid extraction of cobalt as a water-soluble cobalt salt has been proposed and employed. The aqueous cobalt solution is recycled to the oxo reaction. The aqueous cobalt solution is alternately treated with a soap-forming acid such as oleic acid and cobalt oleate is recovered and recycled. Also the water-solution of cobalt salt is neutralized to precipitate the hydroxide which is suspended in an organic liquid such as the olefin and thence recycled to the oxo reaction. A still further improvement in the aqueous extraction technique, as pointed out in U.S. Patent 2,816,933 is to treat the aqueous extract solution with crude alcohol product resulting from hydrogenation of crude decobalted aldehyde at elevated temperature and pressure in the presence of synthesis gas; i.e., $CO+H_2$. There results a partitioning of cobalt between the aqueous and organic liquid layers. The recovered organic layer now containing the cobalt is recycled to the oxo reaction.

The foregoing is not intended as an exhaustive evaluation of the decobalting processes heretofore proposed but rather is presented to show the complex systems heretofore proposed and the prior emphasis placed on removing the cobalt in an aqueous phase rather than keeping it in the organic phase.

This invention provides a decobalting process employing steam at atmospheric pressure or slightly above, say 5 to 10 p.s.i.g., which does not force the cobalt into the aqueous phase, contrary to present practices, but rather converts the cobalt catalyst into a form so that when the mixture is permitted to separate, there results three separable distinct phase: a clear top organic phase, a clear water bottom phase and at the interface between the organic and water phases a thick black suspension as a third phase. This third phase contains the cobalt and is hereinafter referred to as the "cobalt interfacial rag." The clear cobalt free top layer and the clear cobalt free aqueous bottom layer both can be drawn off leaving the cobalt interfacial rag. The cobalt in the cobalt interfacial rag can be recovered as a cobalt soap as hereinafter described and recycled to the oxo reaction.

By a modification of the process of the above atmospheric pressure steam treatment, the cobalt can be converted into a form which passes into the organic layer. Following atmospheric steam treatment a gas containing free oxygen is passed into the mixture until there is no dark precipitate or so that no precipitation occurs. The resulting mixture is permitted to settle. Only two layers form: a clear bottom aqueous layer and a top colored organic layer. The water layer substantially free of cobalt can be drawn off to discard or recycled to supply the steam as in the case where the cobalt interfacial rag is formed. The organic or oil phase can be readily distilled to obtain an organic fraction and a bottoms fraction containing the cobalt. The bottoms fraction, about 1 to 20% of the organic phase, can be recycled to the oxo reaction to supply the cobalt catalyst and when so done the reaction rate is at least equal to fresh catalyst as will be hereinafter illustrated. The aldehyde-alcohol product recovered from the organic phase is of equal stability to the aldehyde-alcohol product obtained from decobalting processes which force the cobalt into insoluble cobalt compounds or water-soluble cobalt compounds and an excellent alcohol product is obtained by hydrogenation of the aldehyde product.

By a further modification, steam and oxygen containing gas are simultaneously employed either in separate streams or as a mixture of steam containing free oxygen such as air. In a batch process, the steam and free oxygen are passed into the oxo reaction product effluent to decarbonylate the cobalt catalyst and convert the cobalt into an oil soluble form as the cobalt carboxylate of the fatty acid present. In a continuous process, streams of oxo reaction product effluent, steam and gas containing free oxygen (or steam containing free oxygen) are contacted. The rates of combining these streams will be dependent upon the size of apparatus employed. Good practice requires that the contact time between the oxo reaction product effluent, steam and free oxygen, residence time of contact, be sufficient to decarbonylate the cobalt catalyst and convert the cobalt to the oil soluble form. In either the batch or continuous simultaneous decarbonylation and oxidation, the desired conversion of cobalt to the oil soluble carboxylate is provided by the use of an excess of oxygen. This condition can be readily followed by analysis of the off or exhaust gas from the treating apparatus for its oxygen content. When no further oxygen is being consumed, the treatment of the oxo reaction effluent product by a batch operation can be stopped. For a continuous treatment by this embodiment, the amount of excess oxygen employed should not provide an explosive mixture and, hence, should not exceed about 4% oxygen by volume on a water vapor free basis. Suitably the excess oxygen will provide not more than 4% oxygen, preferably 1 to 3% oxygen, by volume in the exhaust gas.

From the foregoing simultaneous treatment with steam and oxygen, the settling of the treated oxo reaction effluent product results in two layers: a clear bottom water layer substantially free of cobalt and an upper oil layer containing oil soluble cobalt. The oil layer is recovered and distilled as hereinbefore described to obtain a cobalt containing bottoms fraction which can be recycled to the oxo reaction to supply the cobalt for the catalyst.

The oxidation technique can, of course, be applied to the organic phase and the cobalt interfacial rag after drawing off the clear bottom aqueous phase.

The oxidation can be accomplished with a commercial oxygen, air, air diluted with inert gas or inert gas containing as little as about 1% oxygen by volume. Also, oxygen or air can be added to the steam, or a stream of steam and a separate stream of gas containing oxygen can be used simultaneously or the steam step carried out first and then oxidation with gas containing oxygen can be carried out in the same or a different vessel. It is preferred to carry out both the steam treatment and the oxidation while agitating the oxo reaction product. Since the steam treatment is carried out at or near atmospheric pressure, the oxidation is preferably carried out at atmospheric pressure, but higher or lower pressures can be employed for the oxidation.

High temperature steam or super-heated steam (live steam) need not be employed, for excellent results are obtained using low temperature wet low pressure steam; i.e., steam at 200 to 220° F. and desirably steam pressure of 0 to 2.5 pounds per square inch gage (p.s.i.g.) preferably at ambient atmospheric pressure. Steaming of the liquid oxo reaction effluent product is accomplished at 100 to 190° F. (effluent product temperature during steaming) and at total pressures in the range of from 10 to 25 p.s.i.a. without live steam (super-heated or dry steam). It will be appreciated that the total pressure during steaming may vary from sub-atmospheric pressure to ambient pressure when there is a substantial portion of the total pressure provided by hydrocarbon vapors. For example, steaming of liquid oxo reaction effluent product at 100 to 190° F. (not over 10 p.s.i.g. when heptene feedstock is employed in the oxo reaction) is especially preferred for this provides a cobalt interfacial rag which is not an aqueous emulsion. The oxidation step is carried out from 75° F. to the boiling point of the olefins present at atmospheric pressure, desirably at 100 to 205° F. and preferably at 150 to 200° F.

Prior to the discovery of the modification of the process of this invention the contact of the oxo reaction product with oxygen (after removal of carbon monoxide and hydrogen) would have been avoided and in fact would be thought to be highly undesirable. It is known that aldehydes react readily with oxygen, especially in the presence of cobalt which is an oxidation catalyst, to form peracids. The peracid is known to react in turn with one mole of aldehyde to form two moles of aliphatic acid. Thus, there would result from oxidation a substantial loss of aldehyde product. However, this does not occur in the modification of the process of this invention.

In general, the oxo reaction is carried out by reacting a mono-olefin with synthesis gas which is a mixture of hydrogen and carbon monoxide and may contain varying ratios of $H_2$ to CO but equal volume ratios are generally preferred. The oxo reaction conditions vary somewhat depending upon the nature of the olefin charge stock; however, the reaction between the olefin charge stock and synthesis gas is generally conducted at pressures above 1000 p.s.i.g., usually in the range of 1400 to 10,000 p.s.i.g. or higher, and at temperatures of at least 150° F., usually in the range of 150° F. to 450° F. The ratio of synthesis gas to olefin may be varied widely as is known in the art and generally is in the range of 2500 to 15,000 cubic feet of synthesis gas (measured at atmospheric pressure and 75° F.) per 42 gallons of olefin charge stock. The exothermic oxo reaction is sufficiently rapid to be carried out continuously. The cobalt catalyst is generally employed in concentrations equivalent to 0.01 to 0.5% cobalt based on the olefin.

The olefin, synthesis gas and cobalt soap such as cobalt naphthenate, oleate, stearate or linoleate are, for example, fed in to the bottom of a tubular reaction vessel wherein sufficient contact and hold time is provided to permit the desired conversion of the olefin charge stock to oxygenated products. The oxo reaction effluent product is removed from the top of the reaction vessel to a high pressure separator operated at about the pressure in the reaction vessel. Intermediate cooling can be carried out, if desired. In the high pressure separator unreacted gases are withdrawn overhead and preferably at least in part recycled to the oxo reaction vessel. The remaining liquid stream of oxo reaction product containing olefin, aldehyde, alcohol, catalyst and water and dissolved gas is transferred to a low pressure separator, operated at 15 to 150 p.s.i.g. Here the dissolved gas is released and withdrawn. The liquid withdrawn from the low pressure separator is then decobalted.

Here the process of this invention departs from the prior art processes. In its broad concept the degassed oxo reaction effluent product is treated with wet steam with agitation provided by the steam and/or by mechanical means at from 0 to 10 pounds per square inch gage (p.s.i.g.) until the cobalt catalyst is decomposed, at least 0.5 minute and generally in the range of from 5 to 15 minutes. Vapors from this steaming are passed through a reflux condenser and uncondensed gases are vented. The steamed, degassed oxo reaction effluent product is permitted to settle, the upper organic layer is withdrawn and distilled to separate hydrocarbons, part of which may be recycled to the reactor, and aldehyde product for hydrogenation to alcohol. The bottom water layer is withdrawn and may be discarded or reused in part or in total.

The cobalt interfacial rag ranging from 0.1 to 20% by volume of the organic layer is produced depending upon time of settling. A commercially satisfactory settling time will produce a cobalt interfacial rag of from 1 to 10% by volume of the organic layer. The cobalt interfacial rag is withdrawn for cobalt recovery in a form for recycle to the oxo reaction vessel.

One method for recovery of cobalt in a form for recycle to the oxo reaction comprises combining the rag with dilute aqueous acid such as 3% sulfuric acid in sufficient volume to convert the cobalt to $CoSO_4$. The resulting aqueous mixture is heated and stirred until the solids disappear. A small amount of air passed into the aqueous acid mixture at above 75° F. hastens the disappearance of the solids. The resulting mixture is permitted to settle forming a clear oil phase and a clear pink colored aqueous phase. The aqueous phase is withdrawn, combined with aqueous alkali metal hydroxide to a pH of about 4.5 to 5.0 and recombined with the oil phase. The acid component of the desired soap such as naphthenic acid, oleic acid, linoleic acid, stearic acid, tall oil acid, and the like is added in an amount stoichiometrically equivalent to the $Co^{++}$. The pH is adjusted to about 7.5 with caustic. The pH of the resulting mixture should be below 8, for at pH 8 and above cobalt is precipitated as the hydrated oxide or hydroxide. At a pH of 7 to 8 the $Co^{++}$ transfers from the aqueous phase to the oil layer as the cobalt soap. The water layer can now be withdrawn and discharged. Any alkali metal remaining in the oil layer containing the cobalt soap must be removed. This can be accomplished by percolating the oil layer through an ion exchanger such as silica gel pretreated with saturated cobalt sulfate solution or by washing the oil layer with aqueous solution of cobalt sulfate.

The following is an alternative procedure to the foregoing conversion of cobalt in the cobalt interfacial rag to a cobalt soap. The cobalt interfacial rag is combined with sulfuric acid as before to form cobalt sulfate. The mixture is heated and stirred while air is passed into it until the solids disappear. The mixture is settled and the aqueous phase is withdrawn and combined with an amount of sodium soap of the higher fatty acid stoichiometrically equivalent to the cobalt present. The pH of the resulting mixture will not reach or exceed a pH of 8 when the sodium soap is added to the aqueous phase containing cobalt sulfate. In this case pH control of this step need not be practiced to prevent precipitation of cobalt as its hydroxide or hydrated oxide.

Another method for recovering cobalt in a form suitable for recycle to the oxo reaction employing the process of this invention is to first treat the oxo reaction effluent product with steam. The steam treated mixture is settled to permit the formation of the aforementioned three phases. The water layer is withdrawn. The oil layer is withdrawn for further processing. To the remaining cobalt interfacial rag there is added the fatty acid for the cobalt soap (i.e., naphthenic acid, oleic acid, stearic acid, linoleic acid, tall oil fatty acid, etc.). The resulting mixture is treated with oxygen as by passing air therethrough at a temperature of from 75° F. and above but not exceeding the boiling point of the olefinic material present (about 170° F. when the olefin feed to the oxo reaction is a heptene fraction) for atmospheric pressure operations. The fatty acid addition is necessary to provide a replacement of the original fatty acid associated with the cobalt when added to the oxo reaction for that fatty acid remained in the withdrawn oil layer. The oxidation step is carried out at a pH below 7, desirably at a pH of 6 and below and preferably in the range of 5 to 6. In general, these are the pH ranges provided by the fatty acid added to the cobalt interfacial rag. During the oxidation the cobalt is oxidized to a form which readily combines with the fatty acid. The course of this treatment can be readily followed because of the characteristic color of the cobalt soaps in contrast to that of the precipitate or suspension in the cobalt interfacial rag. The resulting cobalt soap containing mixture can be recycled to the oxo reaction to supply cobalt for the catalyst.

A modification of the steam-treating decobalting step, as hereinbefore described, involves adding oxygen to the steam as air or even inert gas containing 1% oxygen by volume or adding oxygen as air or a more dilute oxygen containing gas to the steam treated mixture. In either case the cobalt is converted to an oil soluble form. The resulting mixture when permitted to settle forms an oil or organic layer with substantially all of the cobalt and a clear water layer which can be withdrawn and discarded or reused in part or in total. The oil layer is distilled to remove hydrocarbons and aldehyde product to leave a bottoms of about 5% by volume of the oil layer. These bottoms can be recycled to the oxo reaction to supply the cobalt for the catalyst. Alternately, the distillation bottoms can be hydrolyzed with aqueous $H_2SO_4$ to convert formate esters and acetals to alcohol and aldehyde. The Co soap will also be converted to $H_2O$-soluble $CoSO_4$. The water phase can then be treated as hereinbefore described.

The following examples will illustrate the process of this invention.

EXAMPLE I

From the reaction of $C_7$ olefin (about 90 moles $C_7$ olefin and 74 moles paraffin) with synthesis gas (80 moles $H_2$, 84 moles CO and 6 moles inert gas as methane) in the presence of 0.14 mole of cobalt metal added as cobalt naphthenate there is obtained a degassed oxo reaction product liquid containing 33 moles $C_7$ olefin, 79 moles paraffin, 43 moles aldehyde, 5 moles alcohol, 2 moles of polymers, dissolved cobalt catalyst, 0.1 mole each hydrogen and inert gas (as methane) and 0.3 mole CO. A portion of the degassed oxo reaction effluent product at 185° F. is added with stirring to a vessel having a reflux condenser open to the atmosphere. Steam at about 220° F. is passed into the stirred liquid mixture as the oxo product is added and nitrogen is added to the vapor space to purge air, CO, etc. through the condenser. When all the degassed oxo reaction effluent product is added, stirring and steam addition are stopped. The resulting mixture is permitted to settle. In a few minutes a clear oil phase rises to the top, clear water settles to the bottom, and, at the interface, a thick black cobalt interface rag forms. The clear oil phase is drawn off to recover the aldehyde-alcohol for hydrogenation and to recover hydrocarbon, part of which may be recycled to the oxo reactor. The clear water layer is withdrawn and discarded or reused in part or in total.

The cobalt interfacial rag and an equal volume of aqueous 3% sulfuric acid are stirred and heated to 205° F. Air is bubbled through the hot mixture until the solids disappeared. The mixture is permitted to settle, the clear oil phase is withdrawn and held for further use in preparing oil soluble cobalt naphthenate and the clear pink aqueous phase is combined with 1.0 normal NaOH solution to a pH of 4.5 to 5.0. The aqueous phase and recovered oil layer are combined. An amount of naphthenic acid stoichiometrically equivalent to the $Co^{++}$ present is added with stirring. Additional sodium hydroxide is added to adjust the pH to between 7 and 8 and the mixture permitted to settle. The aqueous phase is withdrawn and discarded. The sodium in the oil phase, present as sodium naphthenate, is removed by treatment with cobalt sulfate as hereinbefore described.

The sodium free cobalt naphthenate containing oil layer is employed as the catalyst in an oxo reaction between synthesis gas and $C_7$ olefin. The results of the oxo reaction will be hereinafter illustrated.

To illustrate the alternate process for forming the cobalt soap hereinbefore disclosed, a cobalt interfacial rag is obtained as described in Example I. The cobalt interfacial rag is combined with dilute aqueous sulfuric acid (5% $H_2SO_4$) in an amount to convert the cobalt to cobalt sulfate. The mixture is stirred and heated at 200° F. while air is passed into the mixture until the solids disappear. The resulting mixture is permitted to settle. Two liquid layers form: an upper clear oil phase and a lower pink aqueous phase. The aqueous phase is withdrawn and combined with an amount of sodium naphthenate stoichiometrically equivalent to the cobalt present (as cobalt sulfate) in the aqueous layer. The mixture is combined with the organic phase and is stirred and held at 200° F. The pH of this mixture stays in the range of 7.0 to 7.5. The mixture is permitted to settle and the aqueous phase is withdrawn. The organic phase is treated with cobalt sulfate as hereinbefore described to remove all the sodium. The foregoing procedures can be practiced to form the cobalt soap using the concentrate obtained after the simultaneous steaming and oxidation treatment of the oxo reaction effluent product and distillation of the organic phase to remove aldehyde and alcohol.

*Example II*

A second portion of the degassed oxo reaction effluent product obtained as described in Example I is treated with 212° F. steam at 5 p.s.i.g. with the liquid effluent being added at 210° F. to the vessel as described in Example I. A small stream of air is added with the steam. The mixture is permitted to settle and the clear aqueous phase is withdrawn and discarded or reused in part or in total. The remaining colored oil phase is concentrated by vacuum distillation 2 to 5 mm. Hg until the residue is 5% of the volume of the oil layer charged.

The concentrate is employed as the cobalt source for the oxo reaction between $C_7$ olefin and synthesis gas. The results will be hereinafter illustrated.

*Example III*

A cobalt interfacial rag is obtained as described in Example I. To the cobalt interfacial rag there is added tall oil fatty acid in an amount slightly in excess of the equivalent portion of cobalt present. The mixture is heated to 170° F. at atmospheric pressure. Air diluted with inert gas to 15% $O_2$ by volume is passed into the mixture until the off gas contains about 4% oxygen by volume. This resulting mixture has the characteristic violet cobalt soap color. This mixture is employed as the source of cobalt catalyst for the oxo reaction of $C_7$ olefin and synthesis gas. The results of this reaction will be hereinafter illustrated.

Six oxo reactions between $C_7$ olefin and synthesis gas (each of the composition described in Example I) are carried out for the purposes of comparing catalyst activity. Each reaction is carried out at 3000 p.s.i.g., about 354 to 358° F. with a cobalt metal concentration of 0.05% by weight based on the olefin. Six different sources of cobalt are employed.

Cobalt source 1—cobalt octoate (purchased)
Cobalt source 2—cobalt linoleate (purchased)
Cobalt source 3—cobalt naphthenate (purchased)
Cobalt source 4—from Example I
Cobalt source 5—from Example II
Cobalt source 6—from Example III The induction period, time for reaction to start as determined by observing a sharp decrease in pressure and a temperature increase, for each cobalt source is:

| Cobalt source: | Induction period—minutes |
|---|---|
| 1 | 17 |
| 2 | 17 |
| 3 | 7 |
| 4 | 8 |
| 5 | 6 |
| 6 | 6 to 8 |

All reactions following the respective initiation periods proceeded at substantially the same high rate.

What is claimed is:

1. A process of converting dissolved cobalt catalyst from the liquid oxo reaction effluent product containing oxygenated products in which aldehyde is present in a substantial amount obtained by the conversion of a monoolefin with CO and $H_2$ in the presence of a cobalt catalyst to a form of cobalt which can be recovered for recycle to the oxo reaction which comprises degassing liquid oxo reaction effluent product, contacting said liquid oxo reaction effluent product at a temperature of from 100 to 190° F. and at a pressure of from 10 to 25 pounds per square inch absolute with wet steam and with a gas containing oxygen at above 75° F. whereby the cobalt catalyst is converted to a form soluble in the organics present and removing an aqueous phase substantially free of cobalt.

2. A process of converting dissolved cobalt catalyst from the liquid oxo reaction effluent product containing oxygenated products in which aldehyde is present in a substantial amount obtained by the conversion of a monoolefin with CO and $H_2$ in the presence of a cobalt catalyst to a form of cobalt which can be recovered for recycle to the oxo reaction which comprises degassing said liquid oxo reaction effluent product, simultaneously contacting degassed liquid oxo reaction effluent product at a temperature of from 100 to 190° F. and at a pressure of from 10 to 25 pounds per square inch absolute with wet steam and oxygen, permitting the resulting mixture to settle whereby only two liquid phases form comprising an upper organic phase and a lower clear aqueous phase substantially free of cobalt, withdrawing the aqueous phase, and concentrating said organic phase leaving a cobalt containing residue of from 1 to 20% of the volume of said organic phase.

3. A process of converting dissolved cobalt catalyst from the liquid oxo reaction effluent product containing oxygenated products in which aldehyde is present in a substantial amount obtained by the conversion of a monoolefin with CO and $H_2$ in the presence of a cobalt catalyst to a form of cobalt which can be recovered for recycle to the oxo reaction which comprises degassing said liquid oxo reaction effluent product, contacting degassed liquid oxo reaction effluent product at a temperature of from 100 to 190° F. and a pressure of from 10 to 25 pounds per square inch absolute first with wet steam in the absence of oxygen to decompose the dissolved cobalt catalyst, then passing a gas containing oxygen into the steam treated degassed fluid oxo reaction effluent product at a temperature above 75° F. until no solids are present, permitting the resulting mixture to settle whereby only two liquid phases form comprising an upper organic phase and a lower aqueous phase substantially free of cobalt, withdrawing said aqueous phase, and concentrating said organic phase to 1 to 20% of its original volume.

4. The process of claim 3 wherein a stream of degassed liquid oxo reaction effluent product and a stream of wet steam containing oxygen are contacted to provide an off gas of not more than 4% oxygen by volume.

5. A process of converting dissolved cobalt catalyst from the liquid oxo reaction effluent product containing oxygenated products in which aldehyde is present in a substantial amount obtained by the conversion of a monoolefin with CO and $H_2$ in the presence of a cobalt catalyst to a form of cobalt which can be recovered for recycle to the oxo reaction which comprises degassing said liquid oxo reaction effluent product, contacting degassed liquid oxo reaction effluent product at a temperature of from 100 to 190° F. and a pressure of from 10 to 25 pounds per square inch absolute first with wet steam in the absence of oxygen to decompose the dissolved cobalt catalyst, permitting the steamed mixture to settle, thereby forming three liquid phases comprising a top organic phase substantially free of cobalt, a bottom aqueous phase substantially free of cobalt, and a cobalt interfacial rag between said organic phase and said aqueous phase, withdrawing said organic phase, withdrawing said aqueous phase, and contacting said cobalt interfacial rag with oxygen in the presence of a fatty acid to convert cobalt into an oil soluble cobalt soap.

6. A process which comprises reacting a mono-olefin with CO and $H_2$ in the presence of a cobalt catalyst under oxo reaction conditions to produce oxygenated derivatives containing a substantial amount of aldehyde wherein the cobalt catalyst remains dissolved in the liquid oxo reaction effluent product, degassing the liquid oxo reaction product contacting said degassed liquid oxo reaction effluent product at 100 to 190° F. and 10 to 25 pounds per square inch absolute with wet steam and oxygen, settling the resulting mixture, withdrawing a substantially cobalt free aqueous phase, recovering cobalt in an oil soluble form and recycling the recovered oil soluble cobalt to the oxo reaction.

7. The process of claim 6 wherein the degassed liquid oxo reaction effluent product is first treated with wet steam and then contacted with oxygen containing gas, wherein during settling only two liquid phases form comprising an upper organic phase and a lower aqueous phase, and wherein the organic phase is concentrated to 1 to 10% of its volume to provide the oil soluble cobalt for recycle.

8. The process of claim 6 wherein a stream of degassed liquid oxo reaction effluent product is contacted with a stream of wet steam containing oxygen and thereafter settled to form only two liquid phases comprising an upper organic phase and a lower aqueous phase, and wherein the organic phase is concentrated to 1 to 10% of its volume to provide the oil soluble cobalt for recycle.

9. The process of claim 6 wherein a stream of degassed liquid oxo reaction effluent is contacted with wet steam in the absence of oxygen, the resulting mixture is settled to form three phases comprising a top organic phase substantially free of cobalt, a bottom aqueous phase substantially free of cobalt and a cobalt interfacial rag, withdrawing also the organic phase, contacting the cobalt interfacial rag, to which an amount of oil soluble fatty acid equivalent to Co in rag has been added, with oxygen until no solids are present to provide the oil soluble cobalt for recycle.

10. A process for separating cobalt in an oil-insoluble form from liquid oxo reaction effluent product containing dissolved cobalt oxo reaction catalyst which comprises contacting liquid oxo reaction effluent product at from 150 to 175° F. and at atmospheric pressure with wet steam to decompose the cobalt oxo reaction catalyst, settling the resulting mixture thereby forming three distinct liquid phases comprising a top organic phase substantially free of cobalt, a bottom aqueous phase substantially free of cobalt and a cobalt interfacial rag, withdrawing the organic and aqueous phases leaving the cobalt interfacial rag, and converting the cobalt interfacial rag to an oil soluble form of cobalt soap through oxidation with free oxygen in the presence of a higher fatty acid.

11. A process for separating cobalt from liquid oxo reaction effluent product containing dissolved cobalt catalyst in a form suitable for recycle to an oxo reaction which comprises contacting liquid oxo reaction effluent product at 150 to 175° F. and at atmospheric pressure with wet steam to decompose said cobalt catalyst; settling the resulting mixture thereby forming three pases comprising: a top first organic phase substantially free of cobalt, a bottom first aqueous phase substantially free of cobalt and a cobalt interfacial rag; withdrawing said first organic and aqueous phases leaving the cobalt interfacial rag; combining the cobalt interfacial rag with dilute sulfuric acid in an amount to form cobalt sulfate; heating and passing air into the resulting acidic mixture until no solids are present; settling the resulting oxidized mixture thereby forming a second aqueous phase and a second organic phase; withdrawing said second aqueous phase; adding alkali metal hydroxide to said second aqueous phase to adjust its acidity to a pH of 4.5 to 5; combining the acidity adjusted aqueous phase, said second organic phase and an amount of higher fatty acid in an amount stoichiometrically equivalent to the $Co^{++}$ present; adjusting the pH of this last formed mixture to a pH in the range of 7 to 8 and settling this mixture thereby forming a third organic phase and a third aqueous phase; withdrawing said third organic phase; and removing alkali metal from said third organic phase by treatment with cobalt sulfate whereby said alkali metal free organic phase contains cobalt in a form suitable for recycle to an oxo reaction.

12. A process which comprises reacting a mono-olefin with CO and $H_2$ in the presence of a cobalt catalyst under oxo reaction conditions to produce oxygenated derivatives containing a substantial amount of aldehyde wherein the cobalt catalyst remains dissolved in the liquid oxo reaction effluent product; withdrawing said liquid oxo reaction effluent product; degassing said liquid oxo reaction effluent product contacting said degassed liquid oxo reaction effluent product at 100 to 190° F. and 10 to 25 pounds per square inch absolute with wet steam and oxygen; setting the resulting mixture; withdrawing a substantially cobalt free aqueous phase; concentrating the remaining organic phase to 1 to 10% of its volume; adding to the concentrate dilute sulfuric acid to form cobalt sulfate; heating and passing air into the resulting acidic mixture until no solids are present; settling the resulting oxidized mixture thereby forming a second aqueous phase and a second organic phase; withdrawing said second aqueous phase; adding alkali metal hydroxide to said second aqueous phase to adjust its acidity to a pH of 4.5 to 5; combining the acidity adjusted aqueous phase, said second organic phase and an amount of higher fatty acid in an amount stoichiometrically equivalent to the $Co^{++}$ present; adjusting the pH of this last formed mixture to a pH in the range of 7 to 8 and settling this mixture thereby forming a third organic phase and a third aqueous phase; withdrawing said third organic phase; removing alkali metal from said third organic phase by treatment with cobalt sulfate whereby said alkali metal free organic phase contains cobalt in a form suitable for recycle to an oxo reaction; and recycling said alkali metal free cobalt-containing organic phase to said reaction of mono-olefin with CO and $H_2$.

13. A process for separating cobalt from liquid oxo reaction effluent product containing dissolved cobalt catalyst in a form suitable for recycle to an oxo reaction which comprises contacting liquid oxo reaction effluent product at 150 to 175° F. and at atmospheric pressure with wet steam to decompose said cobalt catalyst; settling the resulting mixture thereby forming three phases comprising: a top first organic phase substantially free of cobalt, a bottom first aqueous phase substantially free of cobalt and a cobalt interfacial rag; withdrawing said first organic and aqueous phases leaving the cobalt interfacial rag; combining the cobalt interfacial rag with dilute sulfuric acid in an amount to form cobalt sulfate; heating and passing air into the resulting acidic mixture until no solids are present; settling the resulting oxidized mixture thereby forming a second aqueous phase and a second organic phase; withdrawing said second aqueous phase; combining said second aqueous phase with an aqueous solution of a sodium soap of a higher fatty acid of a pH in the range of 7 to 8; combining this mixture and said second organic phase and settling thereby forming a third organic phase and a third aqueous phase; withdrawing said third organic phase; and removing alkali metal from said third organic phase by treatment with cobalt sulfate whereby said alkali metal free organic phase contains cobalt in a form suitable for recycle to an oxo reaction.

14. A process which comprises reacting a mono-olefin with CO and $H_2$ in the presence of a cobalt catalyst under oxo reaction conditions to produce oxygenated derivatives containing a substantial amount of aldehyde wherein the cobalt catalyst remains dissolved in the liquid oxo reaction effluent product; withdrawing said liquid oxo reaction product; degassing said withdrawn liquid oxo reaction effluent product; contacting said degassed liquid oxo reaction effluent product at 100 to 190° F. and 10 to 25 pounds per square inch absolute with wet steam and oxygen; settling the resulting mixture; withdrawing a substantially cobalt free aqueous phase; concentrating the remaining organic phase to 1 to 10% of its volume; adding to the concentrate dilute sulfuric acid to form cobalt sulfate; heating and passing air into the resulting acidic mixture until no solids are present; settling the resulting oxidized mixture thereby forming a second aqueous phase and a second organic phase; withdrawing said second aqueous phase; combining said second aqueous phase with an aqueous solution of a sodium soap of a higher fatty acid of a pH in the range of 7 to 8; combining this mixture and said second organic phase and settling thereby forming a third organic phase and a third aqueous phase; withdrawing said third organic phase; removing alkali metal from said third organic phase by treatment with cobalt sulfate whereby said alkali metal free organic phase contains cobalt in a form suitable for recycle to an oxo reaction; and recycling said alkali metal free cobalt-containing organic phase to said reaction of mono-olefin with CO and $H_2$.

References Cited by the Examiner

UNITED STATES PATENTS

| | | | |
|---|---|---|---|
| 2,547,178 | 4/51 | Spence | 260—604 |
| 2,679,534 | 5/54 | Koontz | 260—604 |
| 2,779,796 | 1/57 | Munger | 260—604 |

LEON ZITVER, *Primary Examiner.*

CHARLES B. PARKER, *Examiner.*